(12) United States Patent
Baena et al.

(10) Patent No.: US 10,588,256 B2
(45) Date of Patent: Mar. 17, 2020

(54) ZERO TURNING RADIUS MOWER ADJUSTABLE TOE BOARD

(71) Applicant: Deere & Company, Moline, IL (US)

(72) Inventors: Sebastian Baena, Monterrey (MX); Ivan Jesus Lopez, Monterry (MX); Robert D. Dunbar, Holly Springs, NC (US); Wesley E. Clontz, Holly Springs, NC (US)

(73) Assignee: DEERE & COMPANY, Moline, IL (US)

(*) Notice: Subject to any disclaimer, the term of this patent is extended or adjusted under 35 U.S.C. 154(b) by 185 days.

(21) Appl. No.: 15/723,797

(22) Filed: Oct. 3, 2017

(65) Prior Publication Data

US 2019/0098830 A1 Apr. 4, 2019

(51) Int. Cl.
| | | |
|---|---|---|
| *A01D 34/00* | (2006.01) | |
| *A01D 34/82* | (2006.01) | |
| *B60N 3/06* | (2006.01) | |
| *A01D 101/00* | (2006.01) | |

(52) U.S. Cl.
CPC .............. *A01D 34/82* (2013.01); *B60N 3/06* (2013.01); *A01D 2101/00* (2013.01)

(58) Field of Classification Search
CPC ............................ A01D 34/82; A01D 2101/00
See application file for complete search history.

(56) References Cited

U.S. PATENT DOCUMENTS

| | | | | |
|---|---|---|---|---|
| 5,102,192 A | * | 4/1992 | Barile, Sr. ............ | A47C 15/004 248/501 |
| 5,409,296 A | * | 4/1995 | Barile .................... | A47C 9/022 248/172 |
| 5,882,082 A | | 3/1999 | Moore | |
| 5,946,894 A | | 9/1999 | Eavenson et al. | |
| 6,497,422 B1 | * | 12/2002 | Bellis, Jr. ............. | B62D 49/065 280/32.7 |
| 7,712,751 B2 | * | 5/2010 | Beal .................... | A01D 34/001 172/257 |
| 7,882,914 B2 | | 2/2011 | Scheele et al. | |

(Continued)

FOREIGN PATENT DOCUMENTS

EP 2000017 A1 12/2008

OTHER PUBLICATIONS

John Deere Eztrak Foot Rest Kit (AM137437). Green Dealer—Parts Catalog [online]. [retrieved Aug. 14, 2017]. Retrieved from the Internet: http://www.shopgreendealer.com/John-Deere-Eztrak-Foot-Rest-Kit-AM137437.html.

(Continued)

*Primary Examiner* — James A English

(57) ABSTRACT

A ZTR mower adjustable toe board includes a one piece sheet metal plate having a rear portion releasably engaged to a cross member extending between left and right longitudinal frame members of a ZTR mower at a plurality of different fore and aft positions. A plurality of tabs may extend rearwardly from the rear portion, each tab having two bends for inserting and securing it in any of a plurality of slots in the cross member. The plate may include an upwardly inclined front portion positioned over a front frame member and resiliently abutting the front frame member at the plurality of different fore and aft positions. A plurality of foot pegs may be mounted to the upwardly inclined front portion.

12 Claims, 4 Drawing Sheets

(56) References Cited

U.S. PATENT DOCUMENTS

| | | | |
|---|---|---|---|
| 8,146,899 B2* | 4/2012 | Hiser | B60N 2/38 |
| | | | 248/636 |
| 8,186,475 B2 | 5/2012 | Sugden et al. | |
| 8,955,832 B1 | 2/2015 | Bartel | |
| 2004/0113388 A1* | 6/2004 | Porter | B60N 3/063 |
| | | | 280/291 |
| 2005/0151334 A1* | 7/2005 | Flowers | B62D 11/003 |
| | | | 280/47.11 |
| 2008/0202874 A1 | 8/2008 | Scheele et al. | |
| 2010/0236444 A1* | 9/2010 | Blonk | A63G 7/00 |
| | | | 104/53 |
| 2012/0049039 A1 | 3/2012 | Scheffler et al. | |
| 2013/0074464 A1 | 3/2013 | Gindt et al. | |
| 2017/0341685 A1* | 11/2017 | Andre | B62D 27/04 |
| 2019/0111812 A1* | 4/2019 | Stover | A01D 67/04 |

OTHER PUBLICATIONS

Walker Adjustable Footrests (8662-10, 8662-9). Walker Adjustable Footrests—Parts Catalog [online]. [retrieved Aug. 14, 2017]. Retrieved from the Internet: mhtml:file://C:\Users\sd21916\Documents\Adjustable Footrests.mht.

Toro | Z Master® Zero Turn Mower with MyRIDE® Suspension System. Product Brochure [online]. The Toro Company, [retrieved Sep. 22, 2017]. Retrieved from the Internet: https://www.toro.com/myride/.

European Search Report issued in counterpart application No. 18197845.3 dated May 16, 2019. (11 pages).

* cited by examiner

ZERO TURNING RADIUS MOWER ADJUSTABLE TOE BOARD

FIELD OF THE INVENTION

This invention relates to zero turning radius ("ZTR") mowers having rear mounted engines and independently powered left and right drive wheels controlled with hydrostatic transmissions.

BACKGROUND OF THE INVENTION

Zero turning radius ("ZTR") mowers have at least one independently powered drive wheel on each side of a frame. Hydrostatic transmissions transmit power to each of the left and right drive wheels, either in forward or reverse. The pair of hydrostatic transmissions, or dual hydrostatic transmission, may be driven by an internal combustion engine. The independent rear drive wheels allow the ZTR mower to turn on a vertical turning axis. The vertical turning axis may be centrally located between the pair of hydrostatic transmissions.

ZTR mowers have frames with left and right longitudinal frame members supported on a forward end by front caster wheels and extending rearwardly to support an internal combustion engine. A mower deck may be suspended between the front and rear wheels. A seated operator may use left and right control levers or other steering controls to control the pair of hydrostatic transmissions driving the left and right rear drive wheels. Internal combustion engines on ZTR mowers are mounted on the mower frame or platform behind the operator seat and rear wheels.

ZTR mowers have floor panels in front of the operator seat and toe boards which are inclined upwardly toward the caster wheels at the front end of the ZTR mower frame. ZTR mower operators may place both feet on the toe board, and may apply pressure onto the toe board to keep their feet in place on slopes or uneven terrain, and to prevent their feet from bouncing due to vibrations or shocks, especially when operating a ZTR mower at speeds of 5-10 mph. Adjustable foot rests are available that clamp onto the frame or may be bolted onto the toe board. However, an improved ZTR mower adjustable toe board is needed that is lower in cost than conventional toe boards, does not require clamping or bolting on additional parts, and may be adjusted by the operator without requiring tools.

SUMMARY OF THE INVENTION

A ZTR mower adjustable toe board includes a plate having a rear portion mounted between a left longitudinal member and a right longitudinal member of a zero turning radius mower frame and having a plurality of tabs extending from the rear portion and inserted into a plurality of slots in a cross member between the left and right longitudinal members in front of the operator seat. The adjustable toe board also includes an upwardly inclined forward portion having a plurality of resilient supports resting on a front cross member of the frame. A plurality of foot pegs may be mounted to the upwardly inclined forward portion at various positions. The ZTR mower adjustable toe board is lower in cost than existing adjustable toe boards, does not require clamping or bolting on additional parts, and may be adjusted by the operator without requiring tools.

DESCRIPTION OF THE PREFERRED EMBODIMENT

Figure 1:
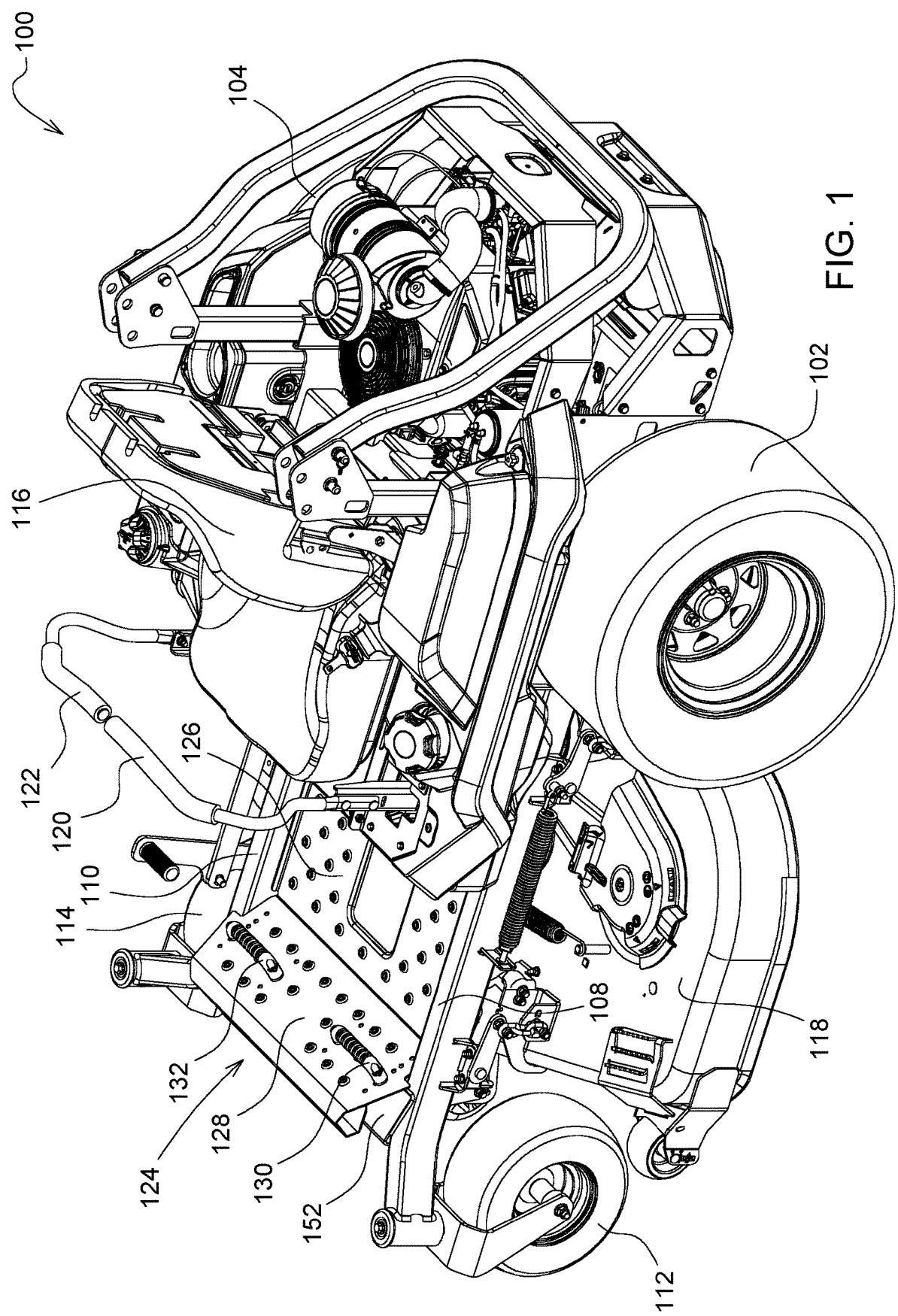
FIG. 1 is a top perspective view of a ZTR mower with an adjustable toe board according to a first embodiment of the invention.
Figure 2:
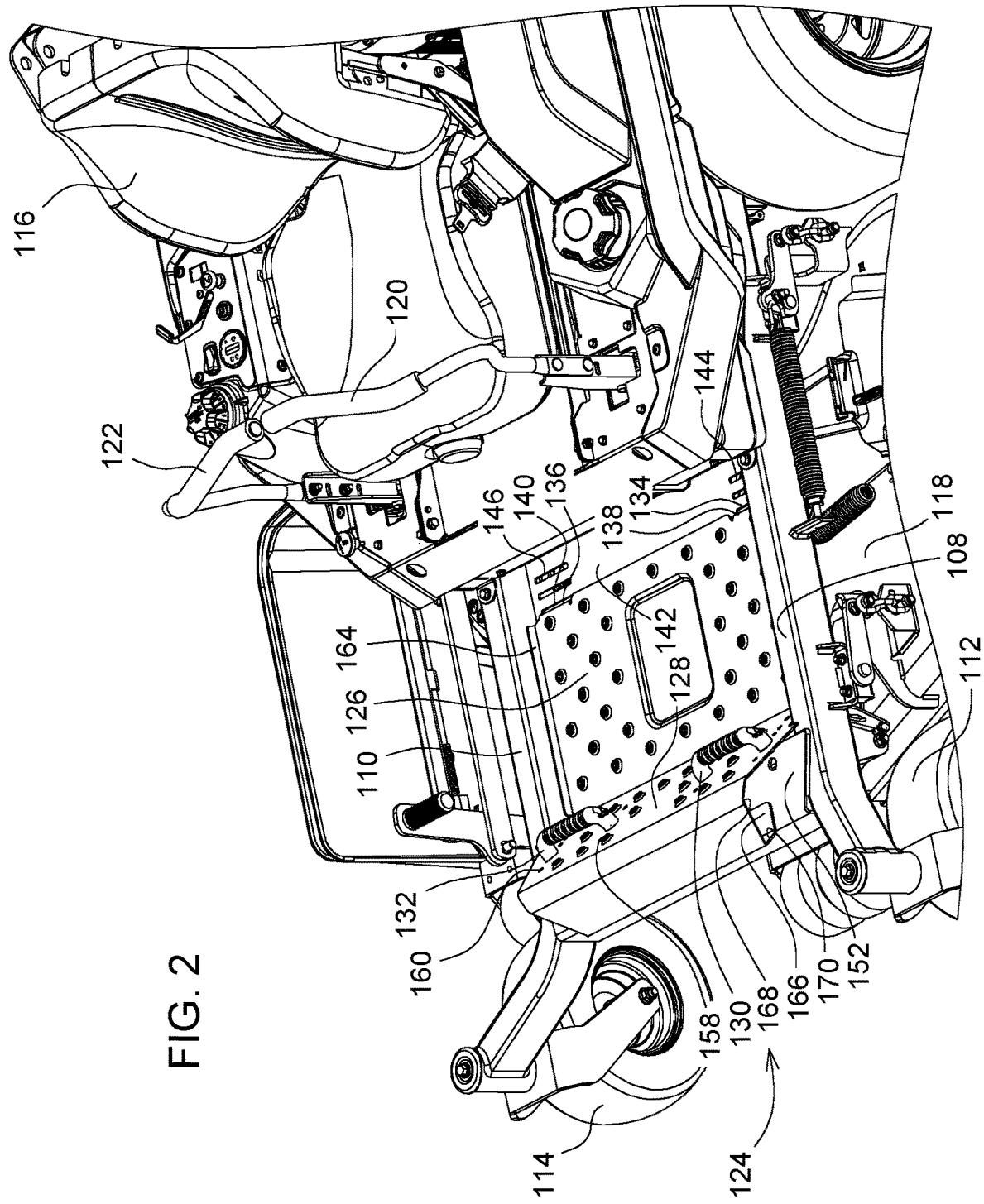
FIG. 2 is a side perspective view of a ZTR mower adjustable toe board in a first position according to a first embodiment of the invention.
Figure 3:
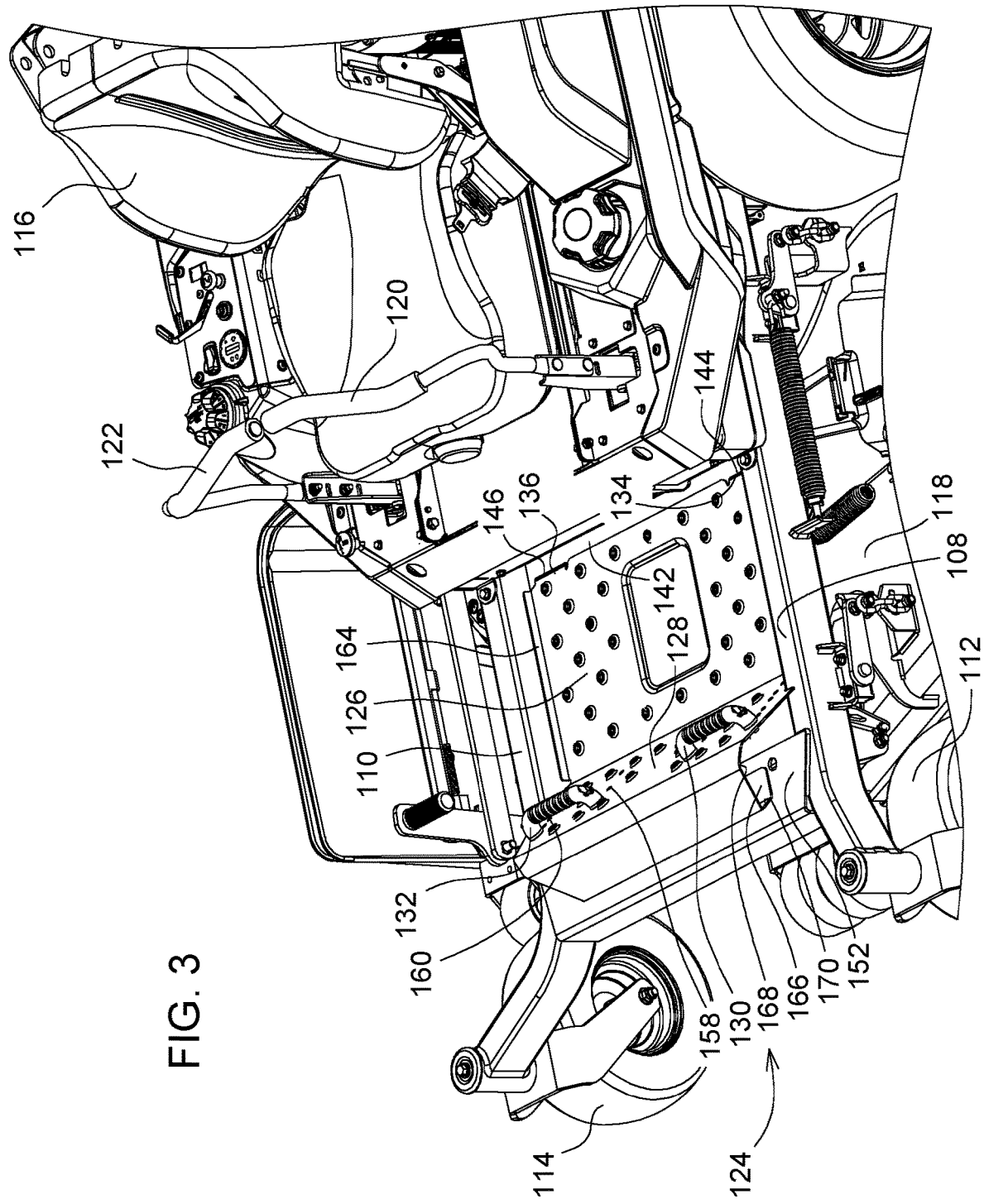
FIG. 3 is a side perspective of a ZTR mower adjustable toe board in a second position according to a first embodiment of the invention.

In the embodiment shown in FIGS. 1-4, zero turning radius ("ZTR") mower 100 has a rear drive wheel 102, 104 on each side of the vehicle that is powered to rotate independently of the other rear drive wheel. The independent rear drive wheels allow the ZTR mower to turn on a vertical turning axis. The ZTR mower may have left and right longitudinal frame members 108, 110 supported on a forward end by front wheels 112, 114 and extending rearwardly past operator seat 116 to support a rear mounted engine and rear drive wheels. Mower deck 118 may be suspended from the frame between the front and rear wheels. A seated operator may use left and right control levers 120, 122 or other steering controls, to control a pair of hydrostatic transmissions driving the left and right rear drive wheels.

In one embodiment, ZTR mower adjustable toe board 124 may be mounted to ZTR mower 100 between operator seat 116 and front wheels 112, 114. The ZTR mower adjustable toe board may be a one-piece sheet metal plate having a rear portion 126 that may be mounted between longitudinal frame members 108, 110 in front of operator seat 116, and an upwardly inclined forward portion 128 extending from the rear portion upwardly over front cross member 152. The ZTR mower adjustable toe board may have a bend between the rear portion and inclined forward portion. The operator may mount the ZTR mower adjustable toe board at any of a plurality of fore-and-aft positions relative to the operator seat and front cross member, and secure it at the desired position without requiring tools. Foot pegs 130, 132 may be fastened to the inclined portion of the ZTR mower adjustable toe board at any of a plurality of locations to support an operator's feet while operating the ZTR mower. The ZTR mower adjustable toe board also may have a number of holes to provide friction and drainage.

In one embodiment, ZTR mower adjustable toe board 124 may include a plurality of tabs 134, 136 extending behind the rear portion 126 of the plate. Tabs 134, 136 may engage a first row of slots 138, 140 in cross member 142. Cross member 142 may be located in front of operator seat 116, and may extend laterally across the ZTR frame between left and right longitudinal frame members 108, 110. To mount the ZTR mower adjustable toe board at a desired position, the operator may pivot the adjustable toe board upwardly and insert the tabs into the first row of slots in cross member 142. The operator then may pivot the adjustable toe board down so rear portion 126 is horizontal. The rear portion of the plate may have upturned left and right edges 162, 164 that fit between the left and right longitudinal frame members. Each tab may have two bends to form an S-shape which allows locking each tab in a slot by pivoting the adjustable toe board down between the left and right longitudinal frame members. Cross member 142 also may include at least a second row of slots 144, 146, positioned forwardly or rearwardly from the first row of slots. The slots allow the operator to mount the ZTR mower adjustable toe board in at least two different fore-and-aft positions, and secure it in place without requiring tools.

Figure 4:
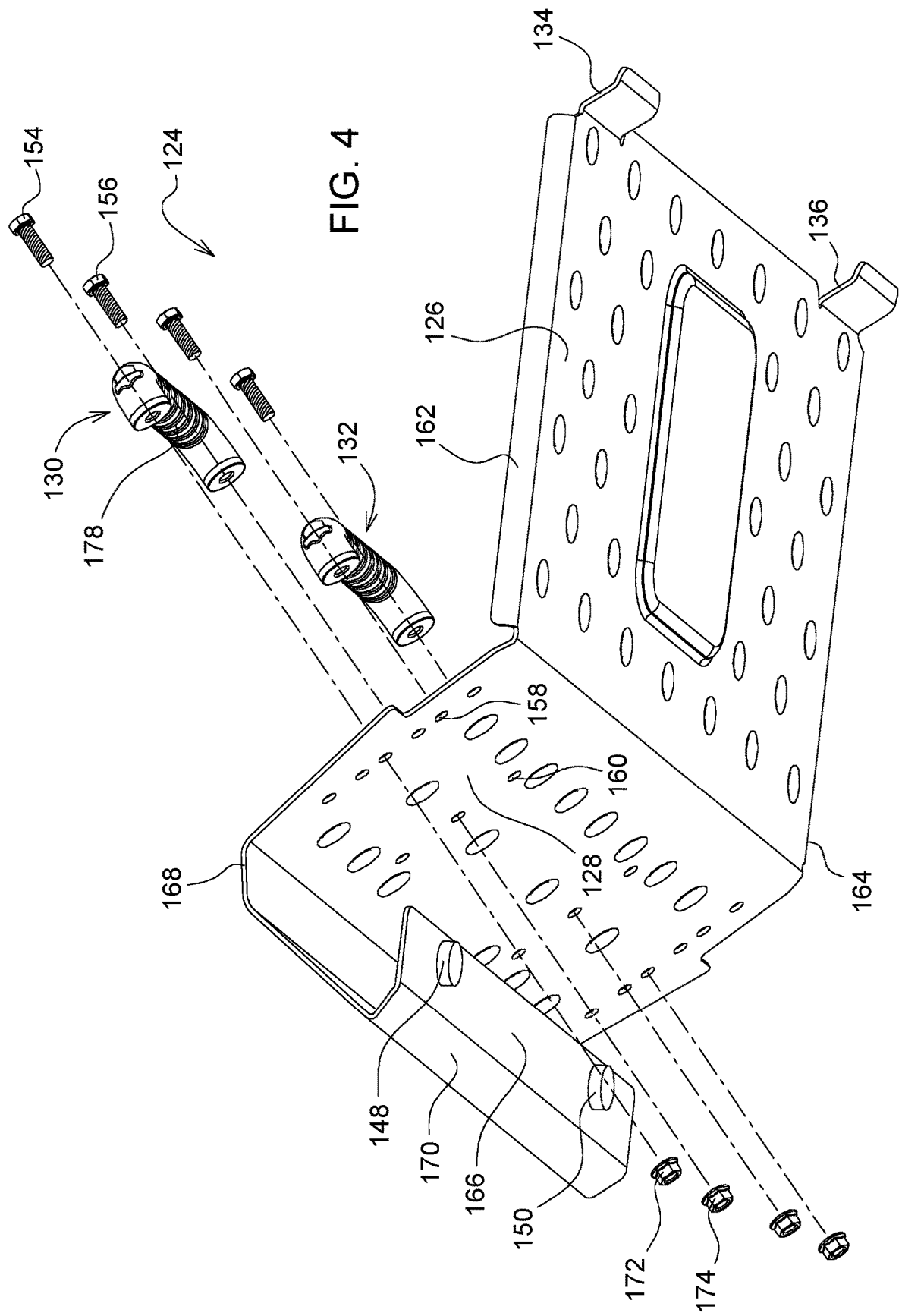
FIG. 4 is a bottom perspective view of a ZTR mower adjustable toe board according to a first embodiment of the invention.

In one embodiment, as shown in FIG. 4, ZTR mower adjustable toe board 124 may include a plurality of resilient supports 148, 150 between the inclined forward portion 128 and the frame of the ZTR mower. Resilient supports 148, 150 may be rubber or other shock absorbing or cushioning material. The inclined forward portion of the plate may include first bend 168, second bend 170, and horizontal surface 166 where the resilient supports may be attached. With the rear portion of the adjustable toe board positioned between the left and right longitudinal frame members, the resilient supports on the inclined forward portion may contact front cross member 152. The resilient supports may abut and rest on front cross member 152 to dampen and reduce any vibrations or shocks to the ZTR mower adjustable toe board, without fastening the resilient supports to the front cross member.

In one embodiment, ZTR mower adjustable toe board 124 may include a plurality of foot pegs 130, 132 mounted to inclined forward portion 128. Each foot peg may be sized to support the heel of an operator's shoe while operating the ZTR mower, providing better stability and relieving stress on the operator's legs. For example, each foot peg may be a generally U-shaped support having a middle portion with a width of at least about 3 inches and a thickness of at least about ½ inch. Each foot peg may include a plurality of surface features such as ridges 178 or protrusions that may provide a non-slip surface to prevent the shoe from sliding off the foot peg. Each foot peg may be mounted to the inclined forward portion of the ZTR mower adjustable toe board by inserting a pair of threaded fasteners 154, 156 from the foot peg through a pair of holes 158, 160 in the inclined forward portion, and securing the threaded fasteners with nuts 172, 174. The operator may mount each foot peg in a plurality of positions by inserting the threaded fasteners through other holes.

Having described the preferred embodiment, it will become apparent that various modifications can be made without departing from the scope of the invention as defined in the accompanying claims.

The invention claimed is:

1. A zero turning radius mower adjustable toe board, comprising:
a plate having a rear portion mounted between a left longitudinal member and a right longitudinal member of a zero turning radius mower frame and having a plurality of tabs extending from the rear portion and inserted into a plurality of slots in a cross member between the left and right longitudinal members of the frame in front of an operator seat;
and having an upwardly inclined forward portion having a plurality of resilient supports resting on a front cross member of the frame;
the plate mountable without tools at a plurality of different fore and aft positions relative to the operator seat.

2. The zero turning radius mower adjustable toe board of claim 1 further comprising a plurality of U-shaped foot pegs mounted on the top surface of the upwardly inclined forward portion.

3. The zero turning radius mower adjustable toe board of claim 1 wherein the inclined front portion includes a horizontal surface where the resilient supports are attached.

4. The zero turning radius mower adjustable toe board of claim 1 wherein the rear portion has upturned left and right edges.

5. The zero turning radius mower adjustable toe board of claim 1 wherein the front cross member includes a plurality of rows of slots.

6. A zero turning radius mower adjustable toe board, comprising:
a one piece sheet metal plate having a rear portion releasably engaged to a cross member extending between a left longitudinal frame member and a right longitudinal frame member of a zero turning radius mower and moveable without tools between at a plurality of different fore and aft positions relative to an operator seat;
and having an upwardly inclined front portion positioned over a front frame member and resiliently abutting the front frame member at the plurality of different fore and aft positions; and
a plurality of foot pegs mounted to the upwardly inclined front portion at a plurality of different positions.

7. The zero turning radius mower adjustable toe board of claim 6, further comprising a plurality of tabs extending rearwardly from the rear portion, each tab having two bends for securely engaging any of a plurality of slots in the cross member.

8. The zero turning radius mower adjustable toe board of claim 6 wherein each of the foot pegs has non-slip surface features.

9. The zero turning radius mower adjustable toe board of claim 6 wherein the foot pegs are U-shaped.

10. A zero turning radius mower adjustable toe board, comprising:
a plate having a rear portion and an upwardly inclined forward portion mountable without tools at a plurality of different fore and aft positions between a pair of longitudinal frame members of a zero turning radius mower; and
a plurality of foot pegs mounted to the upwardly inclined forward portion at a plurality of positions.

11. The zero turning radius mower adjustable toe board of claim 10 further comprising a plurality of resilient supports mounted between the upwardly inclined forward portion and a cross member of the frame.

12. The zero turning radius mower adjustable toe board of claim 10 further comprising a cross member extending between the pair of longitudinal frame members and having a plurality of rows of slots that are engaged by a plurality of tabs extending from the rear portion of the plate.

* * * * *